United States Patent [19]

Wentworth

[11] 4,008,897
[45] Feb. 22, 1977

[54] SEALS FOR ROTATING SHAFTS, ESPECIALLY FOR STERN TUBE SEALS FOR SHIPS

[75] Inventor: Donald Wentworth, Tufnell Park, England

[73] Assignee: Howaldtswerke-Deutsche Werft Aktiengesellschaft Hamburg und Kiel, Kiel Diedrichsdorf, Germany

[22] Filed: Sept. 23, 1974

[21] Appl. No.: 508,619

[30] Foreign Application Priority Data

Sept. 28, 1973 Germany .................. 2348816

[52] U.S. Cl. ........................ 277/9; 277/58
[51] Int. Cl.² ........................ F16J 15/54
[58] Field of Search .......... 277/9, 11, 58, 34.3, 277/187

[56] References Cited
UNITED STATES PATENTS

| | | |
|---|---|---|
| 2,925,291 | 2/1960 | Bygbjerk .................... 277/9 |
| 3,432,172 | 3/1969 | Hendrickson ............... 277/11 |
| 3,514,114 | 5/1970 | Monahan .................... 277/9 |
| 3,563,555 | 2/1971 | Koons ........................ 277/9 |
| 3,773,336 | 11/1973 | Walter et al. ............... 277/9 |

Primary Examiner—Robert I. Smith
Attorney, Agent, or Firm—Stevens, Davis, Miller & Mosher

[57] ABSTRACT

A seal for a rotating shaft, especially for the stern tube seal of a ship, with at least one radial sealing ring bearing in sealing manner against the shaft or a shaft bush, or at least one reserve sealing ring mounted on a support, which can be moved by axial displacement of the support into a working position on the shaft, wherein the support is arranged so as to be axially movable in guides on parts of the housing of the seal and is provided with a chamber for receiving a pressure medium, especially a hydraulic medium, for moving the support to bring the sealing ring (reserve sealing ring) into a working position on the shaft.

2 Claims, 2 Drawing Figures

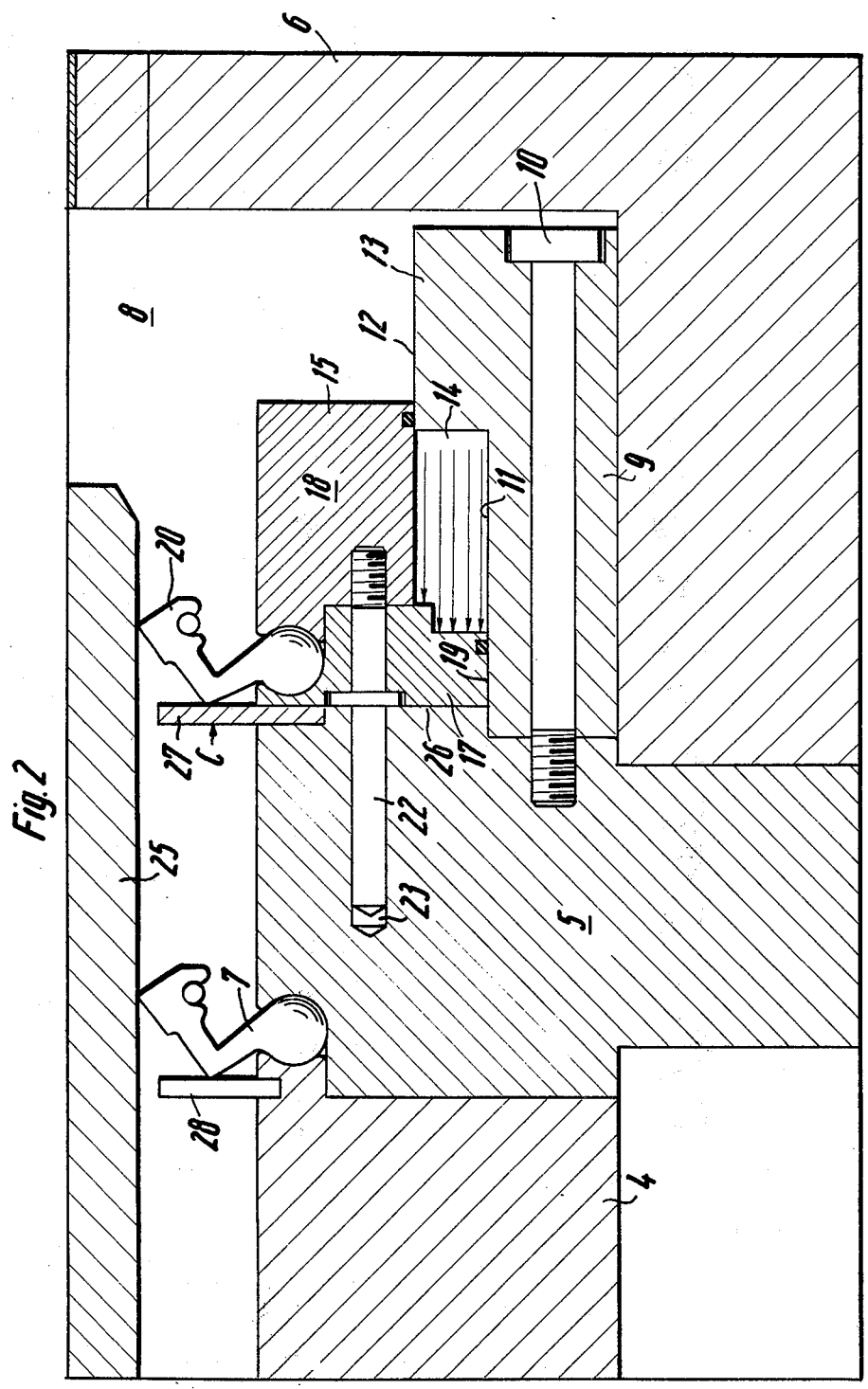

SEALS FOR ROTATING SHAFTS, ESPECIALLY FOR STERN TUBE SEALS FOR SHIPS

BACKGROUND OF THE INVENTION

1. Field of the Invention

The invention relates to a seal for rotating shafts, especially for stern tube seal apparatus, using radial lip seals which bear in sealing manner against the shaft or a shaft bush.

2. Description of Prior Art

Seals are known, especially stern tube seals, in which a number of radial lip seals are arranged one after the other. After one or more of these sealing rings have worn out it is necessary to change the sealing rings. In order to permit of further running with the seal when a sealing ring has worn out it is known that one can provide a reserve slide ring or a reserve sleeve sealing ring which is brought into operation by a support device after the particular working sealing ring has worn out.

Furthermore a sealing arrangement for stern tube seal apparatus has been proposed which uses stationary sealing rings, such as bellows sleeves or the like, sealing against a bush rotating with the propeller shaft, which is provided on the sides facing the ship of the front and rear seal with spaces shaped like hollow rings for taking replacement seals, and where the spaces have a filling of coolant for the external cooling of the built-in active sealing rings and of the stern tube bearing, and at the same time hold replacement sealing rings; in this case the filling with coolant completely surrounds the replacement sealing rings. In the case of this seal, after a damaged lip seal has been destroyed and removed a reserve sealing ring is brought into the operating position by a support.

Finally a seal for stern tubes for ships is known in which a plurality of sealing rings are arranged at a distance from one another on a support, and in which one or more reserve sealing rings are provided. In this design, the support of the sealing rings can move axially relative to the shaft or bush and the diameter of the shaft or bush in the axial zone which is opposite the reserve sealing ring or the reserve sealing rings in the out-of-operation position is smaller than the internal diameter of the reserve sealing ring or rings, whereas in the axial zone in which the reserve sealing ring or rings are in the working position it is so great that the reserve sealing ring or rings bear in sealing manner on the shaft.

The problem underlying the invention consists in providing, in the case of seals of the above-mentioned type for rotating shafts using at least one sealing ring which can be moved into a working position, a simple and effective control for moving the reserve sealing ring support with at least one reserve sealing ring or also the operational sealing rings into a working position, in which this displacement movement of the reserve sealing ring or rings or also of the working sealing rings is achieved by using a pressure medium.

SUMMARY OF THE INVENTION

According to the invention, there is provided, a seal for a rotating shaft, especially for the stern tube seal of a ship, with at least one radial sealing ring bearing in sealing manner against the shaft or a shaft bush, or at least one reserve sealing ring mounted on a support which can be moved by axial displacement of the support into a working position on the shaft, wherein the support is arranged so as to be axially movable in guides on parts of the housing of the seal and is provided with a chamber for receiving a pressure medium, especially a hydraulic medium, for moving the support to bring the sealing ring (reserve sealing ring) into a working position on the shaft.

By means of such a design it is possible for a pressure medium (e.g. hydraulic oil) to be forced from outside, for example using a pump (hand pump), into the chamber for the hydraulic medium and in this way the sealing ring support will move the reserve sealing ring or rings or also the working sealing rings with a guided sliding movement on the shaft so that then the sealing ring or rings engage to provide a seal on the shaft or on a bush rotating with it.

According to a preferred form of embodiment of the invention, if the invention is to be used for reserve sealing rings, the support is constructed as a cylindrical ring and is provided on its circumference with guide surfaces for guiding its movement into the working position of the sealing ring (reserve sealing ring).

According to a practical form of embodiment of the invention, the cylindrical ring carrying the sealing ring or sealing rings (reserve sealing ring) is provided with a shoulder which is supported on its outer surface for sliding movement in a supporting part of the housing.

According to a practical form of embodiment of the invention, respective stepped guide surfaces may be provided in the housing of the seal, for the outer circumference of the support of the sealing rings (reserve sealing ring) and for the shoulder connected with it.

As a result of such an arrangement it is ensured that an effective surface guide is provided for the reserve sealing ring support which excludes the possibility of a tipping of the reserve sealing ring support during the sliding movement into the working position for the reserve sealing ring or reserve sealing rings.

According to a further form of embodiment of the invention, the wall of the chamber for the hydraulic liquid may be formed by one end face of the movable support, and another part of the wall of this chamber is formed by a stationary part of the housing of the seal.

The efficient guiding of the support of the reserve sealing ring or of the reserve sealing rings can be improved still further according to a further practical form of embodiment of the invention in that the support is connected with a number of sliding rods distributed around its circumference which are guided so as to slide in recesses in a stationary part of the housing of the seal. In this case the design is preferably arranged in such a way that the ends of these guide rods when the reserve sealing ring support is in the position of rest engage with their front ends in the recesses in the stationary part of the housing of the seal so that in this way the accurate guiding of the reserve sealing ring support is promoted still further when it moves into the working position for the reserve sealing ring or reserve sealing rings.

BRIEF DESCRIPTION OF THE DRAWINGS

FIG. 2 shows a vertical longitudinal section through the lower part of the same seal, in which the reserve sealing ring support is located in the displaced position and the reserve sealing ring is located in the operating position.

DETAILED DESCRIPTION OF THE INVENTION

Figure 1:
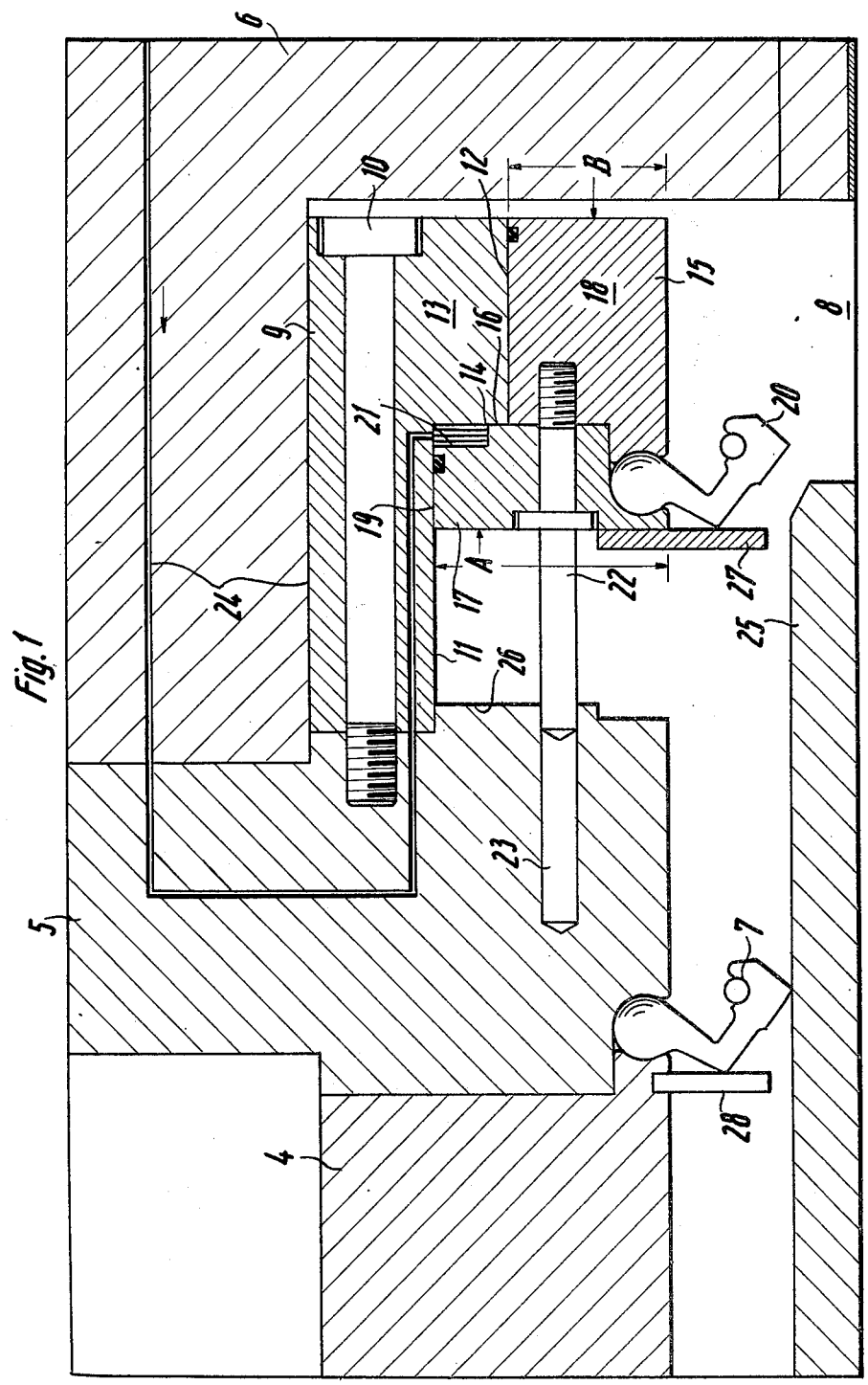
FIG. 1 shows a vertical longitudinal section through an upper part of a seal, for example a stern tube seal, in which the reserve sealing ring support and a reserve sealing ring are arranged in the position of rest.

In the drawings, references 4, 5 and 6 designate parts of a seal housing for a stern tube, whilst a radial sealing ring mounted between the housing part 4 and the housing part 5 is marked 7. Naturally it is possible for several radial sealing rings 7 to be arranged one behind the other.

The part 6 of the housing, which is firmly joined to the part 5 of the housing, is provided with an annular chamber 8 in which a double guide designated 9 is secured, for example by means of bolts 10, to the housing section 5. This guide 9 has an inner guide surface 11 of greater diameter, and a guide surface 12 of smaller diameter on a step 13. By means of the step 13 an annular end surface 14 is formed, the purpose of which is explained later. In the sliding guide 9, 11 and 12 is slidably mounted a reserve sealing ring support which is generally marked 15, and which is formed with a step 16. This reserve sealing ring support 15 has the form of a cylindrical ring 17 of larger diameter and a shoulder piece 18 which is integral with it or is firmly attached to it. The cylindrical outer surface of the shoulder piece 18 is a sliding fit in the shoulder 13 of the guide 9. The outer circumference of the cylindrical ring 17 fits at 19 for a sliding movement against the inner guide surface 11 of the guide 9.

The sealing ring support 15 supports a reserve sealing ring marked 20, and is provided on its surface facing the step 13 with a recess 21, the wall of which is accordingly formed on one side by a part of the end face of the cylindrical ring 17 and on the other side by the wall of the step 13 and the guide 9. In this embodiment the cylindrical ring 17 and its shoulder piece 18 are represented as two different parts which are firmly joined to one another by a thread and a threaded pin. This threaded pin projects out of the free end surface of the cylindrical ring 17 and forms a guide rod 22 which projects in the position shown in FIG. 1 partly into a recess 23 which is formed in the housing part 5.

The annular chamber 21 formed between the cylindrical ring 17 and the guide 9 and its step 13 is connected via a conduit 24 formed in the housing part 9 with a source of pressure medium, for example a pump (not shown in the drawing).

If it is now found that, for example, the sealing ring 7 is worn out, a pressure medium, for example a hydraulic liquid, is fed through the conduit 24 under pressure into the chamber 21 so that the cylindrical ring 17 together with its shoulder piece 18 is moved towards the left out of the position represented in FIG. 1, whereupon the guide rods 22 distributed around its circumference move into the recesses 23 in the housing part 5. When this is done the reserve sealing ring support 15 is guided at its outer circumference 19 in the guide surface 11 of the guide 9 and at the same time the shoulder piece 18 is guided at its outer surface on the inner surface 12 of the guide 9 until the end position is reached, as represented in FIG. 2. In this position, as can be seen, the reserve sealing ring 20 has been moved into its working position against a shaft 25 or a bush rotating with it. In this position the reserve sealing ring support 15 is pressed against an end wall 26 of the housing part 5 so that in this way the reserve sealing ring 20 is firmly held in its working position.

If desired, it is possible to provide for the reserve sealing ring 20 a support as shown at 27, which can also be used for one or more working sealing rings, as indicated at 28 in FIGS. 1 and 2.

The invention provides a seal for rotating shafts, especially for stern tube seals, in which a reserve sealing ring or several such can be brought into working position in a very simple manner, or else working sealing rings 7 can be brought into a different position on the shaft or bush if the points of engagement of the working sealing rings on the circumference of the shaft or bush should be worn away. In the latter case the sealing ring support is designed in the manner shown in FIGS. 1 and 2 with reference to the reserve sealing ring support.

Such a design for stern tube seals of ships is of particular importance because on the stern tube seal itself no mechanical manipulations of any kind are necessary for bringing into action the reserve sealing ring or rings or for moving the working sealing rings. It is sufficient to introduce a hydraulic pressure medium, as a result of which the movement of the reserve sealing ring or rings or of the working sealing rings takes place. Pressure medium pumps or hydraulic pumps are available on any ship and there is no difficulty in connecting such a pump by means of a flexible pipe to the feed pipe 24 leading to the cylindrical chamber 21 and after the displacement movement has been carried out the feed pipe can be closed once again.

I claim:

1. A seal for a rotating shaft for the stern tube seal of a ship comprising a housing, a rotatable shaft within said housing, at least one radial sealing ring bearing in sealing manner against the shaft or a shaft bush, a support within said housing, at least one spare sealing ring mounted on said support, guides for said support movable within said housing, said support being movable by axial displacement of the support from a reserve position into a working position on the shaft, the support together with at least one spare sealing ring being movable in said guides on parts of the housing of the seal, the support of the spare sealing ring comprising on one side an annular shoulder which is supported on its outer surface for sliding movement in a supporting part of the housing, the support of the spare sealing ring being provided on its opposite side with guiding means being shiftable in a stationary part of the housing of the seal, the support on one side being provided with a chamber for receiving a pressure medium, especially a hydraulic medium, for moving the support and the spare sealing ring into a working position on the shaft, the said guiding means on one side of the support bearing one spare ring being formed by a number of sliding rods distributed around its circumference which are guided so as to slide in recesses in a stationary part of the housing of the seal.

2. The sealing for a rotating shaft for the stern tube seal of a ship according to claim 1, characterized in that the wall of the chamber for the hydraulic liquid is formed by one end face of the movable support, and another part of the wall of this chamber is formed by a stationary part of the housing of the seal.

* * * * *